Patented Jan. 7, 1941

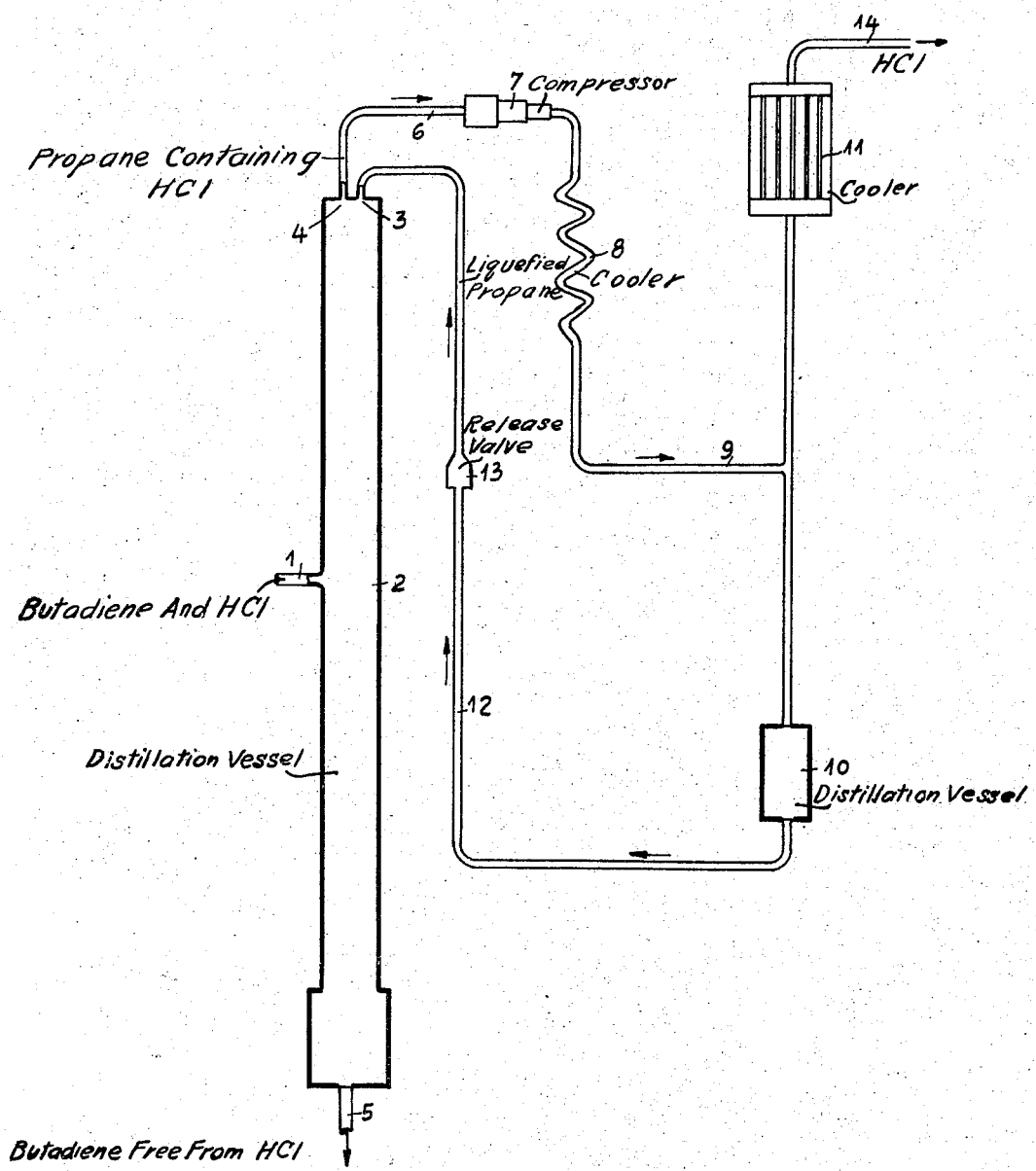

2,227,953

UNITED STATES PATENT OFFICE 2,227,953

SEPARATION OF HYDROGEN CHLORIDE FROM MIXTURES CONTAINING THE SAME

Hans Baehr, Ludwigshafen-on-the-Rhine, and Wilhelm Deiters, Leuna, Germany, assignors to Jasco Incorporated, a corporation of Louisiana Application August 9, 1939, Serial No. 289,184
In Germany August 15, 1938

5 Claims. (Cl. 23—154)

The present invention relates to the separation of hydrogen chloride from gaseous mixtures containing hydrogen chloride and olefinic hydrocarbons, more particularly mono- and diolefines containing at least four carbon atoms.

In the preparation of such olefines or diolefines by dehydrogenating paraffinic hydrocarbons with the aid of chlorine or by splitting off hydrogen chloride from mono- and dichlorparaffins, it is frequently necessary to separate the hydrogen chloride from the hydrocarbons. This can be done, for example, by washing out the gaseous mixtures containing hydrogen chloride with water, aqueous hydrochloric acid or with alkali lye. In many cases, however, it is desirable to carry out the separation of the hydrogen chloride in the absence of water. For this purpose the mixture containing hydrogen chloride which has been liquefied under pressure may be subjected, for example, to a fractional distillation or to a fractional condensation. In both cases, however, there is the risk that under the conditions prevailing during the separation the hydrogen chloride may cause the diolefines to undergo undesirable by-reactions with the result that not only various chloro derivatives of olefines but also polymerisation products are formed. The method of subjecting liquefied gas mixtures containing hydrogen chloride and diolefines to a fractional distillation thus only allows of recovering but small proportions of the diolefine present, while the bulk is obtained in the form of the undesirable by-products mentioned and is thus rendered useless. The same holds true in the working up of mono-olefines containing hydrogen chloride.

We have now found that the separation of hydrogen chloride from mixtures containing the same and olefines (which expression also includes diolefines) containing at least four carbon atoms can be most advantageously carried out in a manner that avoids the above drawbacks by contacting the mixture, while in the gaseous state, with a liquid substance which is stable to hydrogen chloride, the boiling point of which lies above that of hydrogen chloride and below that of olefines or diolefines containing at least four carbon atoms.

This process is particularly suitable for the separation of hydrogen chloride from gas mixtures containing butylene, pentene, butadiene or higher olefines or diolefines or mixtures thereof. The mixtures of these hydrocarbons with hydrogen chloride may also contain other hydrocarbons, such as are formed in small amounts in the splitting off of hydrogen chloride from chlorparaffins, such as methane, ethane, ethylene or propylene. Among substances which are stable to hydrogen chloride there may be mentioned paraffin hydrocarbons having a low molecular weight, such as propane, propylene or also certain halogenated hydrocarbons, such as methyl chloride, vinyl chloride and dichloro-difluormethane. The suitability of a particular substance (hereinafter referred to as "separating agent") as regards its stability to hydrogen chloride depends on the temperature at which it is used, i. e. on the boiling point of the olefine or diolefine contained in the gas to be freed from hydrogen chloride.

The present invention will be further described with reference to the accompanying drawing, which illustrates, by way of example, the recovery of butadiene from a gas mixture containing hydrogen chloride resulting in the cracking of dichlorbutane, propane being used as the separating agent. However, the present invention is not restricted to the use of propane or the particular arrangement of apparatus shewn in the drawing.

The gas mixture containing both butadiene and hydrogen chloride is led without pressure through opening 1 into the distillation vessel 2, which is well insulated and provided with sieve bottoms or charged with filler bodies. Liquefied propane is then introduced through opening 3, likewise without pressure. It flows over the sieve bottoms or filler bodies in counter-current to the gas containing hydrogen chloride. When the liquefied propane and the gas mixture contact, the propane is evaporated to a more or less large extent, whereas the butadiene is liquefied and flows downwards intermixed with a more or less large amount of propane. The hydrogen chloride is entrained by the propane vapors. The propane containing hydrogen chloride leaves the distillation vessel 2 through opening 4, while butadiene which is free from hydrogen chloride can be withdrawn from the lower end of the vessel through opening 5, intermixed, as the case may be, with propane.

The distillation vessel may communicate directly with an apparatus for the separation of hydrogen chloride from propane. For example, the propane containing hydrogen chloride may be passed through pipe line 6 into the compressor 7, where the mixture is liquefied by application of a pressure of say 15 atmospheres. It is then passed through a cooler 8, which is cooled by means of water of room temperature, into pipe line 9. The hydrogen chloride is then distilled off in a second distillation vessel 10 provided with cooler 11 for cooling to low temperatures, whereas the propane which contains but little hydrogen chloride may be passed through pipe line 12 and a release valve 13 into the distillation vessel 2, where it may be employed anew for separating off hydrogen chloride. In this manner it is possible to withdraw continuously through pipe 14 pure hydrogen chloride which can easily be liquefied by pressure. Any further constituents of the gas mixture to be freed from hydrogen chloride which have a boiling point below that of the separating agent will be separated off together with the hydrogen chloride whereas those constituents boiling above the separating agent will be found together with the olefine containing at least four carbon atoms.

The following example serves to further illustrate how this invention may be carried out in practice but the invention is not restricted to this example.

Example 150 cubic meters of a gas mixture which results from the thermal splitting of dichlorbutane and contains 27 per cent of butadiene, 5 per cent of propylene, 2 per cent of butylene and 66 per cent of anhydrous hydrogen chloride are cooled to room temperature and then introduced in the course of an hour into an apparatus as shewn in the accompanying drawing. 140 kilograms of liquefied propane which has been cooled down to 45° below zero C. are then injected per hour through opening 3. The temperature inside the distillation apparatus is such that the liquid butadiene which collects at its bottom is steadily kept slightly boiling. The liquid withdrawn through opening 5 only still contains 0.2 per cent by weight of hydrogen chloride, whereas the mixture of hydrogen chloride and propane which escapes through the opening 4 in addition contains 0.8 per cent of butadiene. This mixture is liquefied in the compressor 7 under a pressure of 15 atmospheres, cooled with water in cooler 8 and then split up into its constituents in the second distillation vessel 10. The propane thus obtained is released from pressure, freed from hydrogen chloride dissolved therein, cooled again to 45° below zero C. and then returned to the distillation vessel 2 without pressure.

The butylene present in the starting gas is condensed together with butadiene, whereas the propylene escapes together with propane vapor and hydrogen chloride.

What we claim is:

1. A process for the separation of hydrogen chloride from mixtures containing the same which consists in bringing into contact a gaseous mixture containing an olefine having at least four carbon atoms and hydrogen chloride with a liquid substance which is stable to hydrogen chloride and has a boiling point above that of hydrogen chloride and below that of the olefine having at least four carbon atoms.

2. A process for the separation of hydrogen chloride from butadiene which consists in bringing into contact a gaseous mixture containing butadiene and hydrogen chloride with a liquid substance which is stable to hydrogen chloride and has a boiling point above that of hydrogen chloride and below that of butadiene.

3. A process for the separation of hydrogen chloride from butadiene which consists in bringing into contact a gaseous mixture containing butadiene and hydrogen chloride with liquid propane.

4. A process for the separation of hydrogen chloride from butadiene which consists in bringing into contact at normal pressure a gaseous mixture of ordinary temperature containing butadiene and hydrogen chloride with liquid propane.

5. A process for the separation of hydrogen chloride from butadiene which consists in bringing into contact at normal pressure a gaseous mixture of ordinary temperature containing butadiene and hydrogen chloride with such an amount of liquid propane that a gaseous mixture is formed containing gaseous propane and substantially all of the hydrogen chloride originally admixed with butadiene, liquefying the gaseous mixture of propane and hydrogen chloride, distilling off therefrom hydrogen chloride and contacting the remaining liquid propane with a gaseous mixture containing butadiene and hydrogen chloride.

HANS BAEHR.
WILHELM DEITERS.